Patented Aug. 21, 1928.

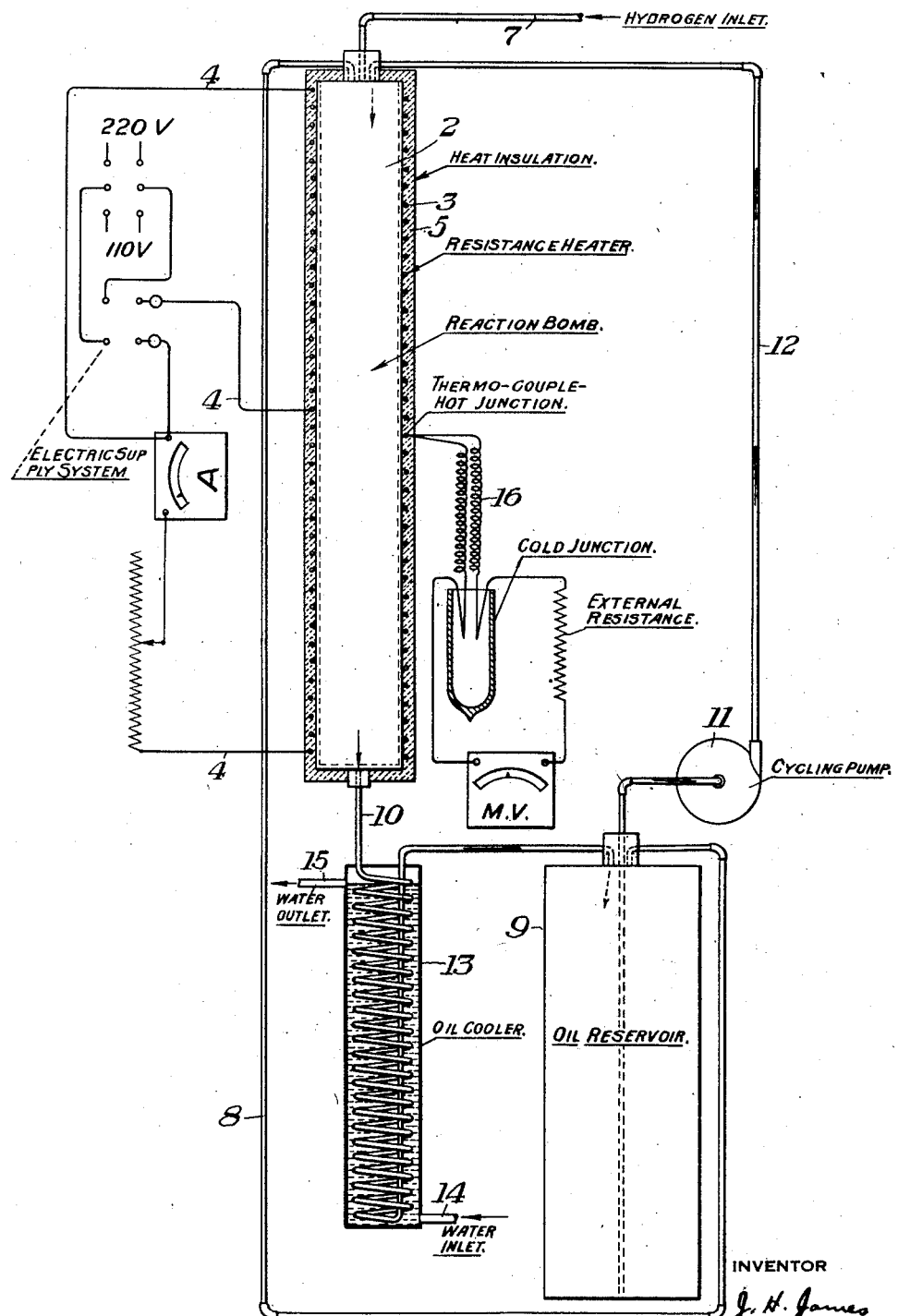

1,681,238

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

PURIFYING PARTIAL OXIDATION PRODUCTS.

Application filed December 14, 1925. Serial No. 75,203.

The figure is a diagrammatic view showing one form of apparatus for carrying out my invention.

In numerous pending applications, I have described a catalytic process for the partial oxidation of hydrocarbons, especially those of the aliphatic, naphthenic and aromatic type having aliphatic side chains. Some of these applications are: Serial No. 272,567, filed January 22, 1919; Serial No. 281,124, filed March 7, 1919; Serial No. 335,939, filed November 5, 1919; Serial No. 435,355, filed January 6, 1921; Serial No. 520,283, filed December 6, 1921; Serial No. 521,033, filed December 8, 1921.

In these applications I disclose processes for the catalytic vapor phase partial oxidation of hydrocarbons, particularly those derived from petroleum, from the oils formed in the low temperature distillation of coals, from the distillation of shale, etc.

In the said process, the hydrocarbons or hydrocarbon derivatives, if in the liquid form, are vaporized; the vapor is mixed with air or oxygen in certain ratios, and the mixture is passed through a reaction chamber at a temperature of from 160° to 170° C. to about 500° C., depending upon the raw material, etc., and preferably, in contact with a catalyst consisting, for example, of molybdenum compounds, oxides or complexes, vanadium complexes or oxides or compounds of similar metals of the classes set forth therein. The exit gas is passed through an absorption system, preferably both of the direct and indirect kind, and the products comprise partial oxidation products in the range from alcohols through alcohol aldehydes, aldehydes and alcohol ketones to oxygenated acids. Each group usually contains bodies of different molecular weights. The acids are principally of the aldehydic and aldehydic hydroxide type. Anhydrides are also present, particularly those of the lactonic type.

Within the range of these products, there is a certain proportion of unsaturated compounds, these compounds containing the well known double bond linkages. This unsaturated condition, together with the aldehydic character of the products, gives certain objectionable characteristics to the products, such as a peculiar odor and a tendency of the acids and other bodies present to resinify and polymerize.

The present invention relates to changing, reducing or eliminating said odor or odors, and is designed to attack the unsaturated or double bonds or double bond linkages in portions of these products and by chemical addition reform them into bodies substantially free from the said objectionable odor and certain other characteristics, such as polymerizing and resinification during saponification.

Another lesser hindrance to the commercial utilization of such products as produced by the main partial oxidation process lies in their color. The products are usually yellow or brown in color, and this color becomes intensified during further treatment, such as saponification, for example.

In carrying out my invention in its preferred form, I employ hydrogen either in its molecular form of when liberated from a hydrogen compound, to attack the unsaturated compounds and convert them, thus improving the products, especially as to odor and color.

My earlier experiments in improving said products were carried out by vaporizing the product and hydrogenating it at atmospheric pressure with the use of catalytic nickel. In such work, while an improvement was obtained, the lowering of the degree of unsaturation was not satisfactory. This was probably due to the high temperature required to keep the product in vapor phase; and, with the use of atmospheric pressures, the concentration of hydrogen in the reaction system could only be made a small fraction of what could be obtained if the hydrogenation were carried out in the liquid phase. Furthermore, in the liquid phase, the reactions can be carried out at lower temperatures, and hence, the hydrogenating action is not reduced or destroyed by further heat reactions which probably occurred in the vapor phase experiments.

I have now found that under proper conditions, the hydrogenation can be carried out in the liquid phase with good results.

In the drawing, in which I show diagrammatically one form of apparatus for carrying out the invention: The numeral 2 is a reaction bomb chamber designed to withstand high pressures and within which the proper pressures and temperatures are maintained. This closed chamber is preferably of steel with removable head, and may be heated by external electric resistance shown at 3, and having suitable electric connections, such, for example, as shown at 4, preferably with lines of different voltages and with suitable control devices for maintaining conditions within the desired range. Heat-insulating lagging 5 is preferably used around the heating means. Within the reaction chamber, I preferably employ a removable reticulated cartridge or basket which substantially fits the interior and may be made of nickel mesh or perforated nickel sheet, this being filled with the nickel catalyst which is preferably deposited on asbestos fibre or similar carrier. 7 indicates a hydrogen supply line which feeds molecular hydrogen into the reaction chamber at a pressure above that maintained in the system; and 8 is a pressure-equalizing pipe which leads from the hydrogen inlet or chamber to an oil reservoir 9. The treated oil passes out of the chamber through pipe 10 to the reservoir 9. 11 is a circulating or cycling pump designed to work under the pressure in the system and interposed in a pipe 12 leading from the lower portion of reservoir 9 back to the reaction chamber inlet. The pump I used in these runs was of the reciprocating type and not adapted to withstand high temperatures. It gave an intermittent or pulsating flow or discharge back into the chamber, which action may be of advantage in the hydrogenating process. I also interposed a cooler 13 between the reaction chamber and the reservoir to cool down the treated oil, this being in spiral coil form within a vessel having cooling water inlet 14 and outlet 15. This cooler was used to prevent injury to the cycling pump. If another type of pump were used, which would withstand the temperature of the oil as well as the pressure used, the cooler need not be used. 16 represents an electric thermocouple system designed to continuously indicate the temperature of the reaction chamber.

During the operation, the oily partial oxidation product was pumped or cycled through the system for several hours and the pressure was maintained by a hydrogen supply under high pressure, the desired temperature in the reaction chamber being maintained by the electric heating system.

This apparatus is designed for hydrogenation under superatmospheric pressures, preferably of 150 lbs. or upwards, using preferably a temperature of from 100° C. to 200° C. upwards, if necessary. Pressures may be used up to or even exceeding 1,000 lbs. as the higher the pressure, the faster is the reaction.

In some cases, it has been found that the partial oxidation product could be passed through a mass of catalyst as a preliminary to further hydrogenation, because in some cases, there are impurities in the product which tend to poison the catalyst. Hence, I have hydrogenated the material in a preliminary way in the presence of a certain amount of catalyst, removed the poisoned catalyst and then subjected the material, thus treated to the hydrogenation proper.

Owing to the fact that the nickel catalyst should not be exposed to air, I have found it best to reduce the nickel oxide with hydrogen in situ, where it is to be used, and then start the hydrogenation when the temperature has been lowered from the reducing temperature to that within the hydrogenation range.

To illustrate the method of working this process, the following run was carried out. A sample of partial oxidation mixture made by the catalytic vapor-phase air-oxidation of the kerosene fraction of Pennsylvania petroleum was distilled and a fraction prepared which showed the following on an Engler distillation and analysis:

Initial____ 125° C.
Up to____ 158° C. ____ 10%
Up to____ 167° C. ____ 20%
Up to____ 173° C. ____ 30%
Up to____ 178° C. ____ 40%
Up to____ 183° C. ____ 50%
Up to____ 188° C. ____ 60%
Up to____ 193° C. ____ 70%
Up to____ 200° C. ____ 80%
Up to____ 211° C. ____ 90%
Up to____ 230° C. ____ 99%
Residue and loss_____ 1%

The oil was treated with sufficient normal caustic soda solution (40 grams per liter) to remove the free acids without removing the anhydrides or inner esters or other esters. After the caustic treatment, the oil was carefully vacuum distilled to remove any sodium soaps remaining dissolved in the oil. This acid removal may be omitted, for example, where high hydrogenation pressures are available, and particularly where an alcohol is added to esterify these acids and to hinder saponification during hydrogenation.

The oil was then cycled through the hydrogenation apparatus at 200 lbs., at a temperature of 250° C. to allow a preliminary charge of nickel catalyst to remove any impurities or catalyst poisons present in the oil. This treatment lasted four hours. The oil was then vacuum-distilled to remove any poisoned nickel and was then hydrogenated with the same apparatus and catalyst in two successive periods of five and seven hours, respectively, at 500 lbs. hydrogen pressure and 250° C. temperature. After vacuum-distillation, in order to remove any dissolved or suspended nickel, the alcohol extraction process disclosed in my application Serial No. 745,024, filed October 21, 1924, and Serial No. 747,106, filed October 31, 1924, was applied to the hydrogenated product. 42% by volume was recovered by the alcohol extraction process. This material was a good solvent for the nitrocellulose employed in lacquer products and the odor and color were much improved and far better than where the solvent was extracted directly from the oxidized oil product of my main partial oxidation process.

To illustrate the change caused by such hydrogenation, I give the following table showing characteristics of the oil before and after hydrogenation:

|  | Before | After |
|---|---|---|
| Iodine No. | 55.1 | 38.6 |
| Aldehyde No. | 74 | 38.1 |
| Ester No. | 16.5 | 6.4 |
| Acetyl No. | 27.4 | 42 |

In this table, the lowering of the iodine number shows that hydrogen had been added at the double bond on a great number of the molecules present. The drop in the aldehyde number and the increase in the acetyl number show that the aldehydes were partly reduced to alcohols. The decrease in the ester number is due to saponification of the esters by the water formed in the reaction. This latter effect can be obviated by hydrogenating a mixture consisting of one of these oxidation products with an excess of ordinary ethyl alcohol. The ethyl alcohol will not be affected by the hydrogenation, but its presence will hinder the saponification of the esters by the chemically formed water during hydrogenation, and the ethyl alcohol can be recovered and re-used. The alcoholic extraction above referred to may be employed either before or after hydrogenation.

Instead of using molecular hydrogenation as in the first method above recited, I may employ a hydrogen compound and liberate the hydrogen therefrom for use in the reaction. Thus, in this second method, I may withdraw hydrogen from water or acids. I may also employ mineral acids in connection with metals. For example, I may employ zinc with sulphuric acid, or iron with water. In case iron is used with water, the acids present in the partial oxidation products will cause a reaction which carries hydrogen into the unsaturated bond portions of the hydrocarbons, under the proper reactive conditions. For example, I may mix water and finely powdered iron with a partial oxidation oily product and heat the mixture up under an invert condenser in batches. In this operation, the reactions will cause hydrogen to be withdrawn from the water and carried into the unsaturated compounds of the partial oxidation products.

As a third method, I may employ halogenation, the halogen used adding on the unsaturated derivatives at the double bonds.

The unsaturated bonds may also be attacked by mild chemical oxidation; for example, with cold potassium permanganate solution which will remove the double bonds; or such unsaturated bonds may be destroyed or changed by the use of hypochlorous acid (HOCl). Various other chemical-treating steps may be employed to reduce or remove the objections, since I consider myself the first to purify the products of my main process and particularly to improve them as to odor and usually color, by chemical addition at the unsaturated bonds in portions of such products.

I claim:

1. In the treatment of a mixture of hydrocarbons which are liquid at normal temperatures and pressures and which already contain artificially-introduced chemically-combined oxygen to different degrees of oxidation in the range from alcohols through aliphatic aldehyde-like bodies to oxygenated organic acids, the step consisting of purifying the same by chemically adding to unsaturated bonds thereof.

2. In the treatment of a mixture of hydrocarbons which are liquid at normal temperatures and pressures and which already contain artificially-introduced chemically-combined oxygen to different degrees of oxidation in the range from alcohols through aliphatic aldehyde-like bodies to oxygenated organic acids, and containing like bodies of different molecular weights, the step consisting of chemically treating double bond linkages thereof and changing the odor of the mixture.

3. In the treatment of a mixture of hydrocarbons which are liquid at normal temperatures and pressures and which already contain artificially-introduced chemically-combined oxygen to different degrees of oxidation in the range from alcohols through aliphatic aldehyde-like bodies to oxygenated organic acids, the step consisting of purifying the same by chemically adding to unsaturated bonds thereof while in the liquid phase.

4. In the treatment of a mixture of hydrocarbons which are liquid at normal temperatures and pressures and which already contain artificially-introduced chemically-combined oxygen to different degrees of oxidation in the range from alcohols through aliphatic aldehyde-like bodies to oxygenated organic acids, the step consisting of purifying the same by chemically adding to unsaturated bonds thereof while under superatmospheric pressure.

5. In the treatment of liquid hydrocarbon partial oxidation products in the range from alcohols to organic acids, the step consisting of removing free acids therefrom, and then purifying the mixture by chemically adding to unsaturated bonds thereof.

6. In the treatment of partial oxidation hydrocarbon products containing aldehyde-like hydrocarbon derivatives of different molecular weights, the step consisting of chemically adding to the unsaturated portions of the hydrocarbon chains and thereby changing the odor.

7. In the treatment of a mixture of hydrocarbons which are liquid at normal temperatures and pressures and which already contain artificially-introduced chemically-combined oxygen to different degrees of oxidation in the range from alcohols through aliphatic aldehyde-like bodies to oxygenated organic acids, the step consisting of purifying the same by chemically adding to unsaturated bonds thereof by hydrogenation.

8. In the treatment of a mixture of hydrocarbons which are liquid at normal temperatures and pressures and which already contain artificially-introduced chemically-combined oxygen to different degrees of oxidation in the range from alcohols through aliphatic aldehyde-like bodies to oxygenated organic acids, the step consisting of purifying the same by chemically adding to unsaturated bonds thereof under superatmospheric pressure and application of heat.

In testimony whereof I have hereunto set my hand.

JOSEPH HIDY JAMES.